(No Model.) 5 Sheets—Sheet 1.
W. HIPPERLING.
MACHINE FOR TESTING TIN CANS.
No. 415,201. Patented Nov. 19, 1889.
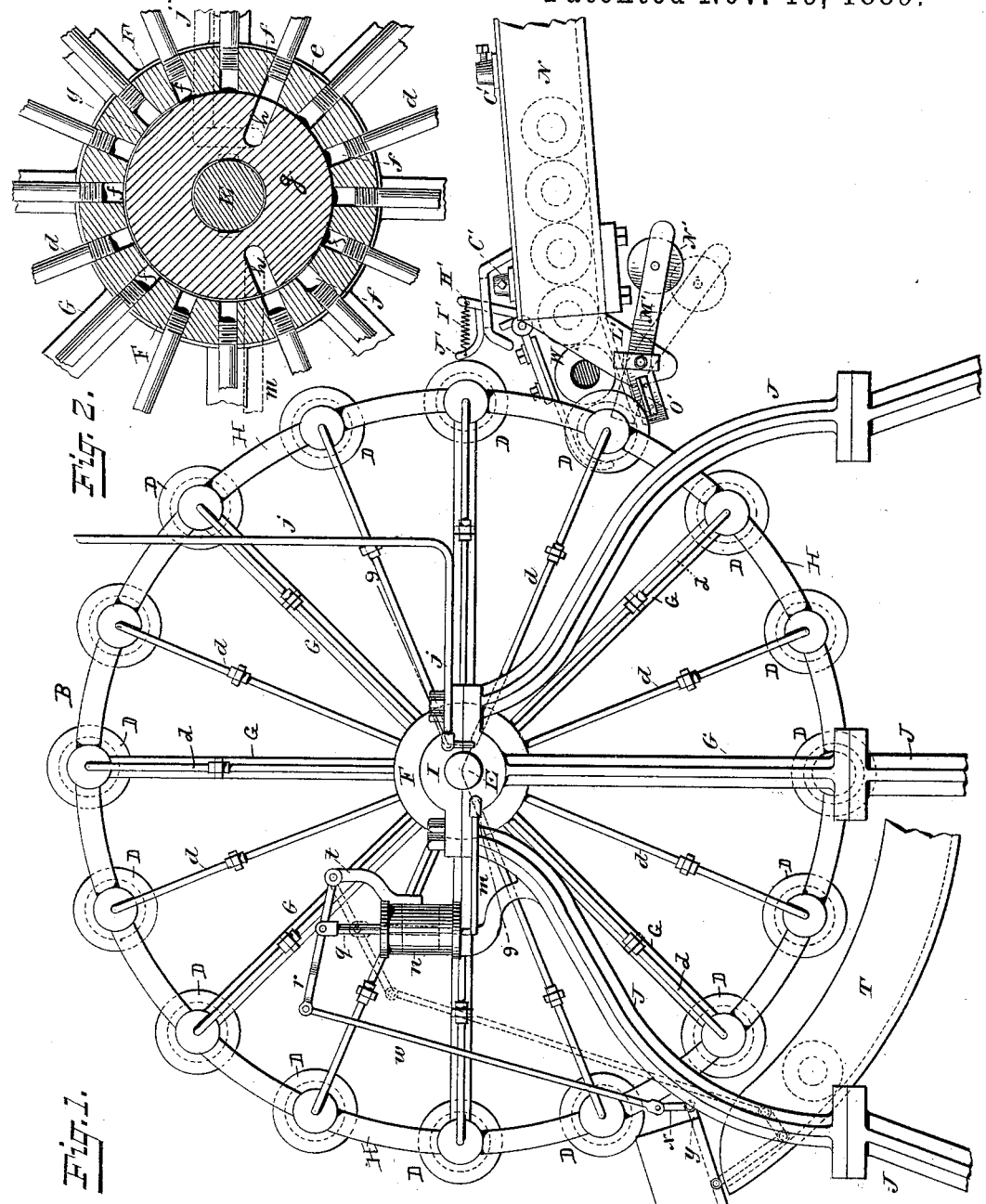
WITNESSES:
INVENTOR
Wm Hipperling
BY
Chas. C. Gill
ATTORNEY

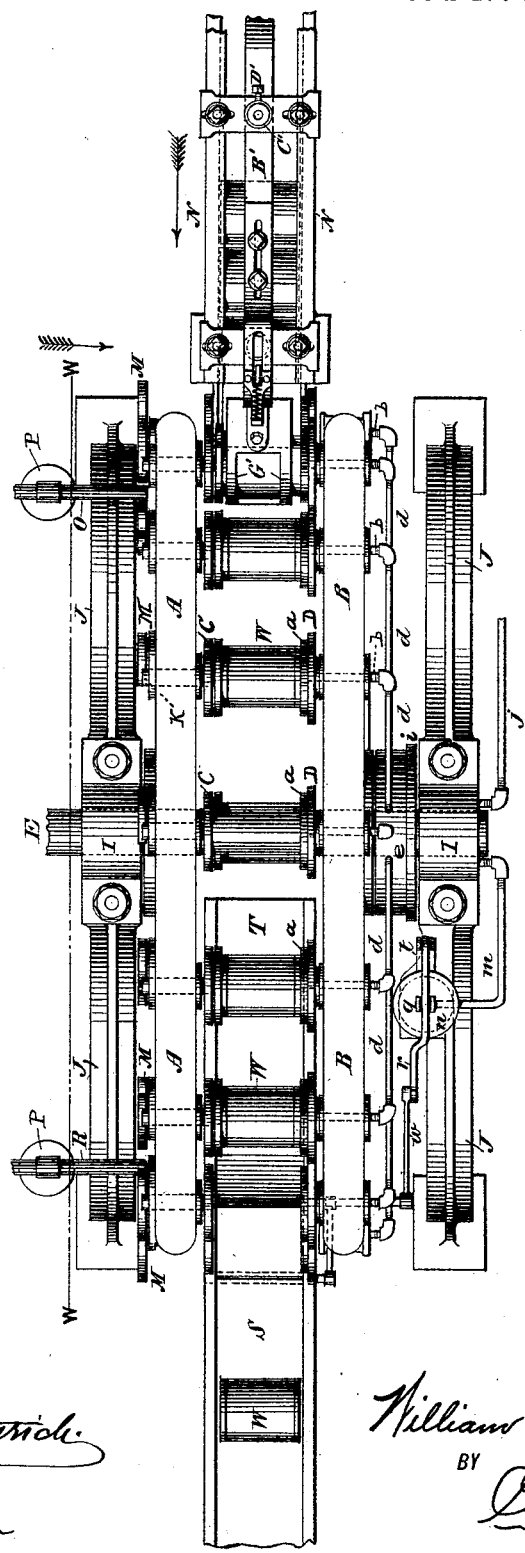

(No Model.) 5 Sheets—Sheet 3.
W. HIPPERLING.
MACHINE FOR TESTING TIN CANS.
No. 415,201. Patented Nov. 19, 1889.
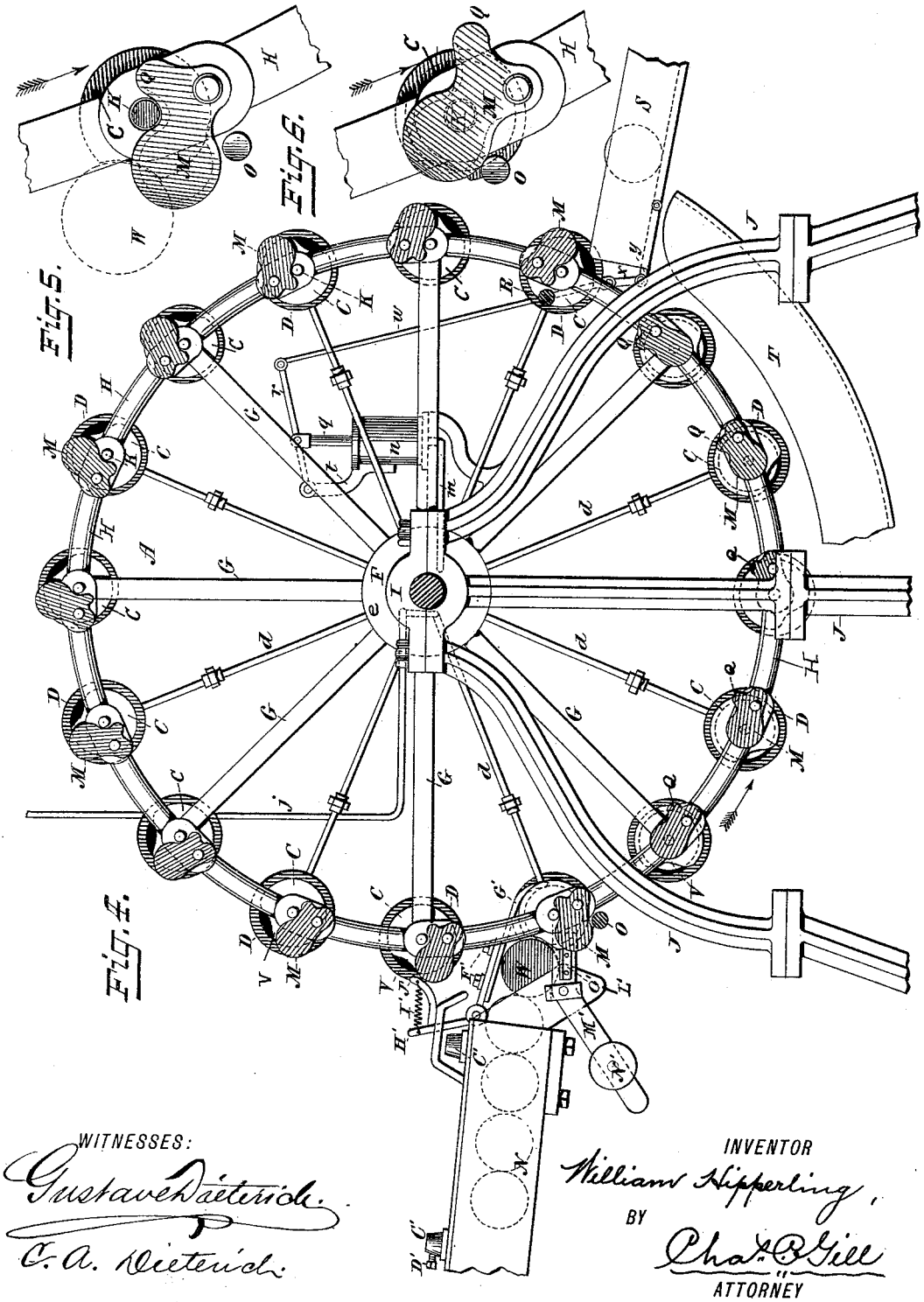
WITNESSES:
INVENTOR
William Hipperling,
BY
Chas. B. Gill
ATTORNEY (No Model.) 5 Sheets—Sheet 4.
W. HIPPERLING.
MACHINE FOR TESTING TIN CANS.
No. 415,201. Patented Nov. 19, 1889.
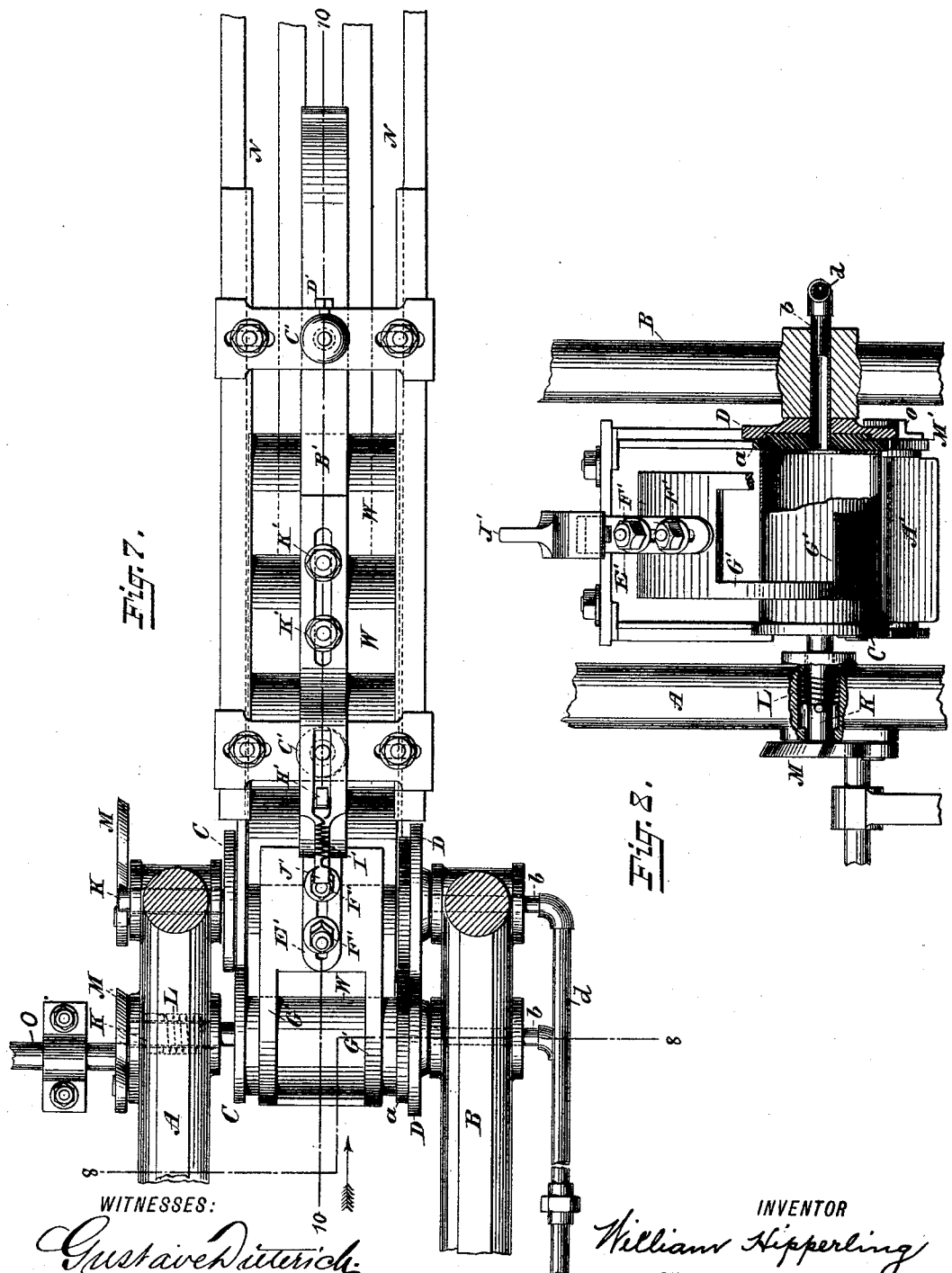
WITNESSES:
INVENTOR
William Hipperling
BY
Chas. C. Gill
ATTORNEY (No Model.) 5 Sheets—Sheet 5.
W. HIPPERLING.
MACHINE FOR TESTING TIN CANS.
No. 415,201. Patented Nov. 19, 1889.
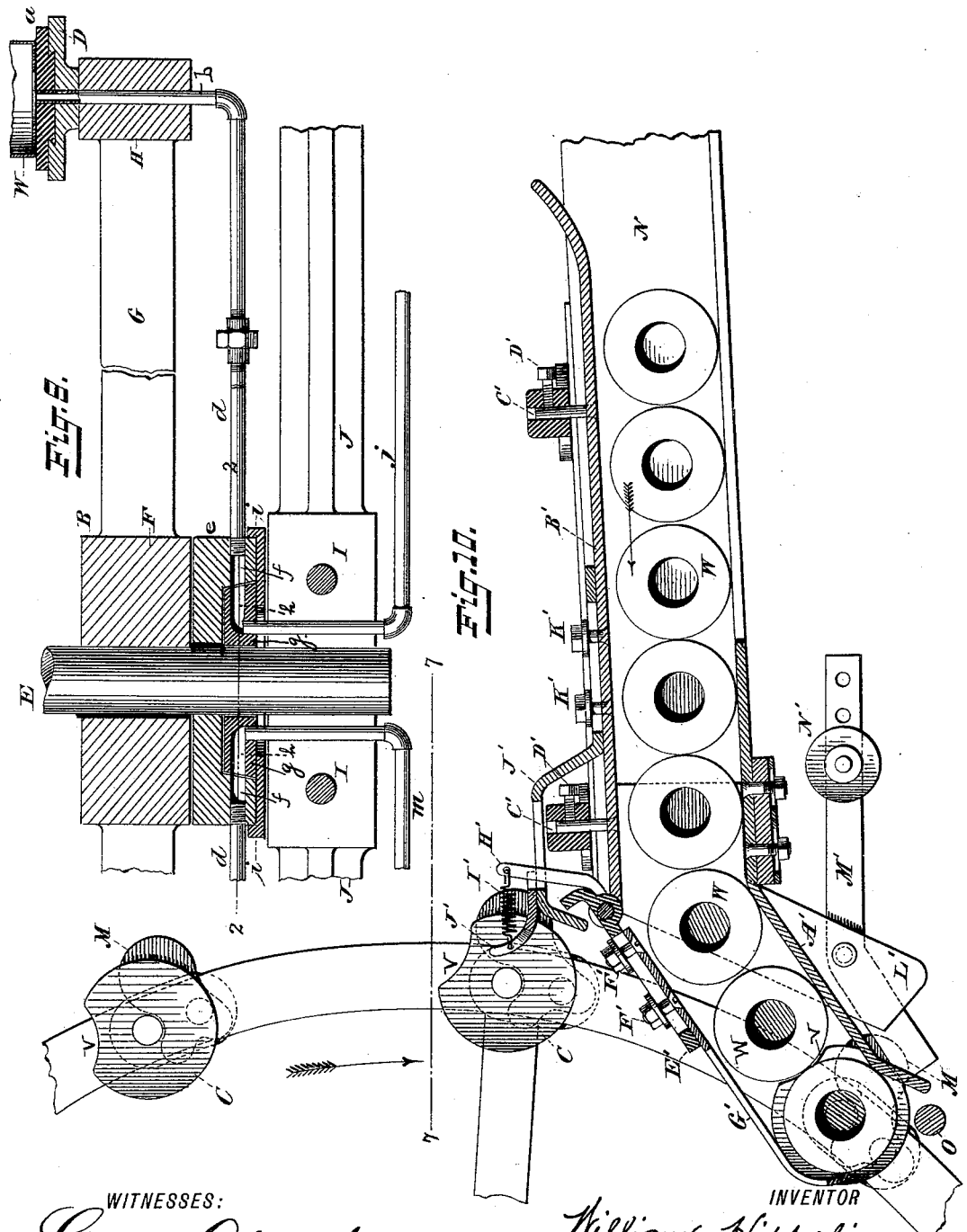
WITNESSES:
Gustave Dieterich
C. H. Dieterich
INVENTOR
William Hipperling
BY
Chas. B. Gill
ATTORNEY

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

MACHINE FOR TESTING TIN CANS.

SPECIFICATION forming part of Letters Patent No. 415,201, dated November 19, 1889.

Application filed July 8, 1889. Serial No. 316,871. (No model.)

*To all whom it may concern:*

Be it known that I, WILLIAM HIPPERLING, a citizen of the United States, and a resident of New York, in the county of New York and State of New York, have invented certain new and useful Improvements in Machines for Testing Tin Cans, of which the following is a specification.

The invention relates to improvements in machines for testing tin cans, and embodies a structure having two revoluble frames or wheels carrying clamping-heads on their facing sides, one series of said heads being movable, means for causing said heads to clamp the cans as they are fed to the machine from a novel feeding device at the end of an inclined can-conveying chute, and automatic pneumatic means for testing the seams of the cans and separating the perfect and imperfect cans from each other, the perfect cans, after leaving the clamping-heads, being delivered to one conveying-chute and the imperfect cans to another chute, the whole being constructed and arranged as hereinafter more particularly described and claimed.

The invention will be more fully understood from the detailed description hereinafter presented, reference being had to the accompanying drawings, in which—

Figure 1 is a side elevation of a can-testing machine embodying the elements of the invention; Fig. 2, a vertical section on the line 2 2 of Fig. 9, this view being presented to show the connection of the series of radial air-pipes which supply air to the cans while the latter are secured between the clamping-heads, with the stationary hub which feeds said radial pipes at one side of the main driving-shaft and at the other side of said shaft is in communication with means for detecting the imperfect cans; Fig. 3, a top plan view of the can-testing machine; Fig. 4, a side elevation of same, looking in the direction of the arrow in Fig. 3, said Fig. 4 illustrating the series of movable clamping-heads with latch mechanism for moving them inward against the cans; Fig. 5, an enlarged detached portion of the periphery of the wheel, showing one of the movable clamping-heads with the latch in position to strike a stationary pin and close over the spindle of said head and move it inward; Fig. 6, a similar view of the same, illustrating the position of the latch after having moved against said stationary pin; Fig. 7, a top plan view of the chute for feeding the tin cans to the testing devices with a section of a portion of the wheels carrying the clamping-heads, said section being on the dotted line 7 7 of Fig. 10; Fig. 8, a sectional view on the dotted line 8 8 of Fig. 7, looking in the direction of the arrow; Fig. 9, an enlarged sectional view on the dotted line 9 9 of Fig. 1, a portion of one of the wheels only being shown; and Fig. 10, a vertical section on the dotted line 10 10 of Fig. 7.

In the drawings, A B respectively designate the frames or wheels, which carry on their periphery the series of facing clamping-heads C D, the former being movable laterally and the latter rigid. The wheels A B are keyed upon the driving-shaft E, and each consists of a hub F, spokes G, and periphery or rim H. The driving-shaft E is mounted in journal-boxes I, and receives its motion from any suitable source of power, said boxes being supported upon frames J.

The movable clamping-heads C are mounted upon spindles K, which extend through the periphery H of the wheel A, as indicated by dotted lines in Fig. 7, said spindles having coiled upon them the springs L, (shown by dotted lines in Fig. 7 and full lines in Fig. 8,) which create an outward tension on the spindles and preserve the heads C close against the periphery of the wheel A, except at such times as the force of the spring is overcome by the latch M, which only acts on the spindles K of the heads C when it is desired to hold a can between the heads C D and carry it from the feed-chute N to the delivery-chutes, hereinafter described.

The latch M for each spindle K is provided with a tapered edge, as indicated by dotted lines in Figs. 5 and 6 and by full lines in Fig. 7, and is pivoted upon the outer side of the periphery of the wheel A in position to have its enlarged outwardly-projecting end brought into contact with the pin O during the revolution of the wheels A B.

The tapered edge of the latches M above referred to operates as a cam to force the spindles K inward, while the body of the latch serves to lock the spindles in their inward position until during the operation of the machine the cans clamped between the heads C D reach the delivery-chutes, at which time the latches are turned on their supporting-pivots to free the spindles K and permit the escape of the cans.

When during the revolution of the wheels A B the latch M comes into contact with the pin O, the latter causes the said latch to turn on its pivot and close over the end of the spindle K, the tapered edge of the latch operating during this movement to force the spindle K inward and moving the clamping-head C against the can W, (see Figs. 7 and 8,) which is at the end of the feeding-chute N in position to be carried between the heads C D to the delivery-chute. After the heads C D have traveled a sufficient distance from the feeding-chute N toward the delivery-chute, the projecting edge (lettered Q) of the latch M comes into contact with the rigid pin R, which has the effect of reversing the movement of the latch M and moving it from over the end of the spindle K, thereby permitting the spring L to retract the clamping-head C from the can W and back to its former position against the periphery of the wheel A, at which time the can, if perfect, will fall upon the inclined chute S and be conducted away, or if imperfect will fall upon the inclined chute T and be by it transmitted in a different direction from that given to the perfect cans.

The means for separating the perfect from the imperfect cans will be hereinafter explained.

The pins O R extend inward toward the machine from the standards P P, as shown in Fig. 3, the said standards serving as supports for the pins and being of ordinary construction.

A latch M is provided for each of the movable heads C, as illustrated in Fig. 4, and the latches are separately acted upon by the pins O R. One edge of the movable clamping-heads is cut away, as shown at V, in order that as one can is clamped between the heads C D at the end of the feeding-chute N the adjacent can may be unaffected; or, in other words, that one can may be clamped without danger of the edge of the head C catching upon and removing the adjacent can. The position of the movable clamping-head C with its removed portion V with respect to the can to be clamped and the adjacent can is illustrated in Figs. 4 and 10, one can W being between the heads C D in position to be clamped by the contact of the latch with the pin O, while the adjacent can W remains in condition to take the place in the feeding device of the first can W as soon as the latter has been drawn from the feeding device by the revolution of the wheels A B.

The fixed clamping-heads D are provided with disks $a$, of rubber or other soft material, upon their inner faces, (see Figs. 7 and 8,) in order that when the cans are clamped they will be uninjured, and that the joint between the cans and the heads D may be air-tight. The heads D correspond in position with the movable heads C, and are retained upon the inner ends of the series of horizontal air-pipes $b$, which extend through the heads D, rubber disks $a$, and the periphery of the wheel B, as illustrated clearly in Figs. 7 and 8, the outer ends of the pipes $b$ being united with the series of radial pipes $d$, which extend from the revoluble collar $e$ (see Figs. 2 and 9) outward to said pipes $b$, entering the clamping-heads D. The revoluble collar $e$ is provided with a series of apertures $f$ to receive the threaded ends of the pipes $d$, as illustrated in Fig. 2, and said collar is keyed upon the main driving-shaft E, and is recessed upon its outer face to receive the stationary disk $g$, which is loose upon the driving-shaft E, and contains the recesses $h$, corresponding in diameter with the apertures $f$ in the revoluble collar $e$. Between the collar $e$ and disk $g$ and the adjacent journal-box I is provided packing $i$, as shown in Fig. 9, for the purpose of forming an air-tight joint between the said disk and collar. From one of the recesses $h$ in the disk $g$ extends the air-pipe $j$, the latter passing through the journal-box I, as shown in Fig. 9, and leading to a suitable source of air under pressure, and from the other recess $h$, on a line about opposite to the recess receiving the end of the pipe $j$, is provided another air-pipe $m$, which is shown in Figs. 1, 2, and 9, and extends through the journal-box I and enters the lower end of the cylinder $n$, (see Fig. 1,) which contains a piston (indicated by dotted lines) secured upon the lower end of the rod $q$, which is pivoted to the lever $r$, one end of the latter being pivotally secured to the rigid bracket $t$ and the other end being in pivotal connection with the rod $w$, which, extending downward and through the link $x$, is pivoted to the hinged section $y$, (shown in its lower position by dotted lines in Fig. 1 and in its upper position by full lines,) said section $y$, when in its upper position, forming a portion of the bottom of the end of the delivery-chute S, and when in its lower position serving to permit the cans leaving the clamping-heads C D to fall upon the chute T, instead of upon the chute S, as hereinafter more particularly explained. During the revolution of the wheels A B the revoluble collar $e$, with the radial pipes $d$, rotates with the shaft E, while the disk $g$, with its pipes $j$ $m$, remains stationary. The pipe $j$ being in connection with the source of air-supply under pressure, the pipes $d$, passing the recess $h$ of the disk $g$, in which said pipe $j$ has an outlet, become filled with air, and the cans being at said periods of the pipes $d$ passing said recess $h$, clamped between the heads C D, air will fill the said pipes $d$ and enter the cans, the rubber facing $a$ of the heads D preventing its escape. The cans thus clamped between the heads C D, as said heads are brought through their air-pipes $d$ into line with the recess $h$, connected with the pipe $j$, are carried downward toward the delivery-chutes S T, and as said cans are in succession brought into line, through their said air-pipes $d$, with the recesses $h$, connected with the air-pipe $m$, their perfection or imperfection is made known from the fact that if the seams of the cans are defective the air will escape therefrom, and the pressure on the pipes $d$, being thus reduced and at the testing-point, the pipe $d$ being in connection, through the recess $h$, with the pipe $m$, the air in the lower part of the cylinder $n$ will pass into the pipe $m$, and thence through the pipe $d$ into the can, thus relieving the pressure below the piston in said cylinder and permitting the said piston to lower, thereby dropping the lever $r$, rod $w$, and hinged section $y$, at which time the can will be freed from the clamping-heads C D by the contact of the latch M with the pin R. The can being thus freed and being imperfect, will be directed into the chute T. If the can carried by the clamping-heads C D had been perfect along its seam, no air would have escaped therefrom, and the pressure in the pipe $d$ and the pipe $m$ would not have been reduced, and hence the piston in the cylinder $n$ had not have fallen, and under this condition the can upon being freed from the clamping-heads C D would have entered the chute S.

The cans are fed to the wheels A B from the chute N, which is inclined so as to give the cans an automatic movement downward toward the wheels A B. Upon the end of the chute N is provided the downwardly-inclined plate A', as shown enlarged in Fig. 10, and said chute has upon its upper portion the plate B', which prevents the cans from losing the particular position which it is desired they should have while being fed to the wheels A B. The plate B' is adjustable vertically by means of the pins C' and set-screws D', in order to be adapted to the different diameters of cans fed along the chute N. The plate B' has upon its end adjacent to the wheels A B the hinged arm E', which has secured to it by set-screws F' the thin plate G', the lower end of which is curved to fit against the body of a tin can, as illustrated in Figs. 8 and 10. The plate G' is also adjustable upon the arm E', in order to adapt it for the different sizes of cans to be tested. The arm E' has a vertical extension H', which is connected by a spring I' with the upwardly-projecting end of the bracket J', as shown in Fig. 10, said bracket being secured to the plate B' by the set-screws K', and being slotted to receive and permit the movement of said extension H'. The bracket J' is adjustable on the plate B', owing to said screws K' passing through the slot in said bracket, the purpose of the adjustment being to regulate the tension of the spring I' on the arm E' and plate G'. Upon the opposite sides of the end of the chute N are provided the downwardly-extending plates L', to which are pivoted the arms M', as shown in Figs. 4 and 10. The purpose of the pivoted arms M' is to serve as guides for the ends of the cans upon the plate A', when said arms are in their upward position, which is that illustrated by full lines in Fig. 4 and by dotted lines in Fig. 1. The outer portion of the arms M' is furnished with a counterpoise N', which serves to preserve the inner ends of said arms in the upper position above referred to, except at such times as the effect of said counterpoise is overcome by the clamping-heads coming into contact with the angle-plates O', (see Figs. 1 and 4,) riveted to the side of said arms. During the revolution of the wheels A B the heads strike the angle-plates O' and force the inner ends of said arms M' downward into the position shown by full lines in Fig. 1, the effect of which is to leave the last can nearest to the wheels A B free at its ends to be clamped by the heads C D. After said can has been clamped by the heads C D and carried from the end of the chute N the counterpoises N' cause the inner ends of the arms M' to reascend to their upper position, as shown in Fig. 4, for the purpose of guiding the ends of the can which takes the place of the one removed from the chute N.

The plate G' is of sufficient weight to prevent the cans from leaving the plate A', except at such times as the cans are clamped by the heads C D, and by them withdrawn from the end of the chute N, the withdrawal of the can serving to raise the plate G' a short distance, and its own weight, with the force of the spring I', thereafter causing it to fall to its former position in time to secure the next following can.

The operation of the invention, in view of the foregoing description, will probably be fully understood without a further detailed explanation. The cans one after another are clamped at the end of the chute N between the clamping-heads C D, and immediately upon the can being clamped the pipe $d$, connected with the can, comes into communication, through the recess $h$, with the pipe $j$, thereby insuring the pipe $d$ and can being filled with compressed air. The can thus clamped and filled with air is carried along until its pipe $d$ is brought into communication with the pipe $m$, when, if the can leaks, the pressure in the pipe $m$ and cylinder $n$ will be reduced and cause the hinged section $y$ to lower, thereby permitting the can, which at this point is freed by the contact of the latch M with the pin R, to fall into the chute T. If the can carried between the clamping-heads C D is perfect, the communication of its pipe with the pipe $m$ and cylinder $n$ will leave the hinged section y unaffected, and the can will fall upon and be carried away by the chute S. The cans are one after another in succession withdrawn from the end of the chute N by the clamping-heads C D and tested by the air-pressure, the cans at the point where the latch M comes into contact with the pin R being freed from the clamping-heads, the perfect cans falling upon the chute S and the imperfect cans upon the chute T. The cans may be thus rapidly and effectually tested and separated within the minimum amount of space, the wheels A B occupying but small space in the factory and requiring slight attention, the entire operation being automatic. After the presence of an imperfect can has caused the piston in the cylinder n and the hinged section y to lower the section y and piston will remain in the position thus given them until a perfect can shall have been brought into communication, through its pipe d and the recess h, with the pipe m, at which time the air from the perfect can and its pipe d will pass into the pipe m and cylinder n and operate to elevate the piston and hinged section y, thus resetting the same in position to direct the perfect cans to the chute S.

What I claim as my invention, and desire to secure by Letters Patent, is—

1. In a can-testing-machine, the wheels A B, mounted on the horizontal driving-shaft E, and having secured on their facing sides the clamping-heads C D, one series of said heads being mounted on spindles and movable toward or from the other series of said heads, combined with the series of latches M, pivotally secured upon the wheel A, adjacent to the outer ends of the spindles of said movable heads, the feed-chute for cans, the delivery-chute, and the pins O R in position to be struck by said latches during the revolution of the wheels A B, for the purpose of thrusting the movable heads inward or permitting them to be moved outward, substantially as and for the purposes set forth.

2. In a can-testing machine, the frames carrying the clamping-heads, one series of said heads being movable, combined with the series of air-tubes extending from one series of said heads to a revoluble collar on the main driving-shaft, the disk having recesses registering with the ends of said air-tubes in said collar, a supply-pipe for air leading into said disk at a point in line with that at which the cans are clamped between said heads, and an air-pipe leading from said disk at the point at which the cans are freed from said heads, substantially as and for the purpose set forth.

3. In a can-testing machine, the frames carrying the can-clamping heads, one series of same being movable, combined with the series of air-tubes extending from one series of said heads to a revoluble collar, an air-supply pipe which communicates with said air-tubes at a point in line with that at which the cans are clamped, an air-pipe which communicates with said air-tubes at a point in line with that at which the cans are freed from the clamping-heads, a cylinder connected with said last-mentioned pipe and containing a piston and piston-rod, chutes for the perfect and imperfect cans, a hinged chute-section, and mechanism, substantially as described, between said hinged chute-section and the piston-rod, whereby the movement of the latter is imparted to the former, substantially as set forth.

4. In a machine for testing tin cans, the chute for feeding the cans, combined with the hinged plate G', having its lower end curved to pass over the body of the can, the plate A', upon which the cans at the end of the chute rest, and a series of clamping-heads for clamping the can at opposite ends and withdrawing it from beneath the said plate G', substantially as and for the purposes set forth.

5. The chute N, having upon its end the plate A' and hinged plate G', combined with the pivotally-secured arms M', and a series of moving clamping-heads, which clamp the cans at the end of said chute and depress the arms M', substantially as and for the purposes set forth.

6. In a can-testing machine, the wheels A B, mounted on the horizontal driving-shaft E, and having secured on their facing sides the clamping-heads C D, the heads C being mounted on spindles and movable toward or from the heads D, combined with means, substantially as described, for moving the heads C, the series of radial air-tubes d in communication with the interior of the clamped cans, the collar e on said shaft E, from which said tubes d radiate, and a source of air-supply under pressure leading into said collar and said tubes, substantially as and for the purposes set forth.

7. In a machine for testing tin cans, the chute N, having the vertically-adjustable plate B', the inclined plate A', the hinged adjustable plate G', and the pivotally-secured arms M', combined with series of movable clamping-heads, which depress the arms M' and clamp the cans at the end of the plate A', withdrawing them from the curved end of the plate G' during their onward movement, substantially as and for the purposes set forth.

8. In a can-testing machine, the frames carrying clamping-heads, and a chute feeding the cans to said heads, combined with the series of air-tubes in communication with the clamped cans, the air-supply pipe in position to communicate with said air-tubes at a given point, the additional air-pipe in position to communicate with said air-tubes as they pass another given point, the cylinder connected with said additional air-pipe and containing the piston and piston-rod, and mechanism, substantially as described, in connection with said piston-rod, for separating the perfect from the imperfect cans, substantially as and for the purposes set forth.

9. The wheels A B, mounted upon the shaft E, and the series of clamping-heads C D, carried on the facing sides of said wheels, the clamping-heads C being movable toward or from the heads D, combined with means, substantially as described, for moving the heads C, the air-tubes $b$ and $d$, communicating through the heads D with the interior of the clamped cans, the collar on the shaft E, from which said air-tubes $d$ radiate, and a source of air-supply leading into said collar and said tubes, substantially as and for the purposes set forth.

Signed at New York, in the county of New York and State of New York, this 1st day of July, A. D. 1889.

WILLIAM HIPPERLING.

Witnesses:
CHAS. C. GILL,
R. A. PORTEOUS.